US012757832B2

(12) United States Patent
Dreer

(10) Patent No.: US 12,757,832 B2
(45) Date of Patent: Oct. 13, 2026

(54) FORAGE HARVESTER

(71) Applicant: AGCO International GmbH, Neuhausen (CH)

(72) Inventor: Constantin Dreer, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 477 days.

(21) Appl. No.: 18/343,568

(22) Filed: Jun. 28, 2023

(65) Prior Publication Data

US 2024/0016091 A1 Jan. 18, 2024

(51) Int. Cl.
*A01D 43/08* (2006.01)
*A01D 43/10* (2006.01)

(52) U.S. Cl.
CPC ............. *A01D 43/08* (2013.01); *A01D 43/10* (2013.01); *A01D 43/105* (2013.01); *A01D 43/107* (2013.01)

(58) Field of Classification Search
CPC ...... A01D 43/08; A01D 43/10; A01D 43/105; A01D 43/107; A01F 12/28; A01F 15/04
See application file for complete search history.

(56) References Cited

U.S. PATENT DOCUMENTS 5,154,364 A * 10/1992 Ketting .................... B02C 4/32 241/230
6,290,599 B1 9/2001 Eis et al.
7,337,995 B2 3/2008 Van Vooren et al.
7,708,221 B2 5/2010 Engel
2005/0263627 A1* 12/2005 Van Vooren ........... A01D 43/10 426/518
2018/0328470 A1* 11/2018 Rotole ................. A01D 43/006
2021/0092903 A1 4/2021 Gross et al.

OTHER PUBLICATIONS

UK Intellectual Property Office, Search Report for related UK Application No. GB2210284.2, dated Dec. 29, 2022, 4 pages.

* cited by examiner

*Primary Examiner* — Brad Harcourt

(57) ABSTRACT

A forage harvester cracker unit comprising a first cracker roller, a second cracker roller, a base frame comprising left and right hand side elements, the first cracker roller being mounted on the base frame to be rotatable about a fixed central axis extending between the left and right hand side elements of the base frame and a secondary frame comprising left and right hand side elements, the second cracker roller being mounted on the secondary frame to be rotatable about a central axis extending between the left and right hand side elements of the secondary frame is disclosed. The forage harvester cracker unit further comprises a pivot axis extending through the base frame and the secondary frame, the secondary frame being adjustable about the pivot axis to enable variation of a separation of the first and second cracker rollers, a biasing element acting between the base frame and the secondary frame to urge the second cracker roller towards the first cracker roller and a drive element acting against the biasing element to hold the secondary frame in position against the biasing element to maintain a minimum separation of the first and second cracker rollers.

8 Claims, 5 Drawing Sheets

FORAGE HARVESTER

CROSS-REFERENCE TO RELATED APPLICATIONS

Not applicable.

FIELD

The present invention relates to an improved forage harvester, and, in particular, to a cracker unit for a forage harvester.

BACKGROUND

It is known to provide forage harvesters with a cracker unit. The cracker unit includes opposing cracker rollers through which harvested crop is fed. The harvested crop is first fed though a chopper unit and then into the cracker unit where it is squeezed and crushed between the opposing cracker rollers before being fed to a discharge spout.

The cracker unit includes a first cracker roller, that is free to rotate, and can be driven about its longitudinal axis and is supported in bearings on a first frame element. The first cracker roller is located toward a first end of the cracker unit. A second cracker roller is provided. In a known construction, the second cracker roller is driven and supported in bearings on a second frame element. The second frame element is located to a second end of the cracker unit and can be linearly adjusted with respect to the first frame in order to adjust a spacing between the first and second cracker rollers. Together the first and second cracker rollers provide an elongate opening between left and right hand sides of the cracker unit through which harvested crop that is to be processed can be conveyed. The first frame element serves as a base of the cracker unit. Additional first and second covering elements are secured to the first frame element to form an upper housing of the cracker unit through which processed crop is directed towards the discharge spout.

A pre-loading arrangement is provided on the second frame element such that the second cracker roller is pre-loaded towards the first cracker roller. Further, the spacing between the cracker rollers is adjustable by means of a linear adjustment apparatus in which the second frame element sits on a slide to adjust the position of the axis of rotation of the moveable second cracker roller with respect to that of the first cracker roller.

The present invention provides an alternate mounting arrangement that enables adjustment of the moveable cracker roller with respect to its fixed counterpart. Other advantages of the present invention will be apparent from the description below.

BRIEF SUMMARY

According to a first aspect of the present invention, a forage harvester cracker unit comprises a base frame comprising left and right hand side elements, a first cracker roller being mounted on the base frame to be rotatable about a fixed central axis extending between the left and right hand side elements of the base frame and a secondary frame comprising left and right hand side elements, a second cracker roller being mounted on the secondary frame to be rotatable about a central axis extending between the left and right hand side elements of the secondary frame, wherein the forage harvester cracker unit further comprises a pivot axis extending through the base frame and the secondary frame, the secondary frame being adjustable about the pivot axis to enable variation of a separation of the first and second cracker rollers, a biasing element acting between the base frame and the secondary frame to urge the second cracker roller towards the first cracker roller and a drive element acting against the biasing element to hold the secondary frame in position against the biasing element to maintain a minimum separation of the first and second cracker rollers characterised in that characterised in that the drive arrangement comprises includes a drive shaft supported for rotation in bearings provided in the left and right hand side elements of the base frame, parallel levers eccentrically mounted on the left and right hand sides of the drive shaft, a distal end of each lever being retained within respective left and right hand side elements of the secondary frame so that rotation of the drive shaft about its axis results in movement of the secondary frame with respect to the base frame and the distance between the rolls to be varied.

Preferably, the biasing arrangement comprises parallel spring elements mounted on the base frame.

More preferably the spring elements act to pull the secondary frame towards the base frame. Even more preferably, the spring elements are mounted adjacent the first cracker roller.

Alternatively, the spring elements act to push the secondary frame towards the base frame. More preferably, the spring elements are mounted adjacent the second cracker roller.

Preferably, the drive arrangement further comprises an actuator to control rotation of the drive shaft.

Preferably, each of the left and right hand side elements of the secondary frame are provided with recessed portions to receive the distal end of each lever.

More preferably the distal end of each lever is provided with a pin to be received within the recessed portions of each of the left and right hand side elements of the secondary frame.

Within the scope of this application, it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

The invention will now be described, by way of example only, with reference to the accompanying drawings, in which.

DETAILED DESCRIPTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
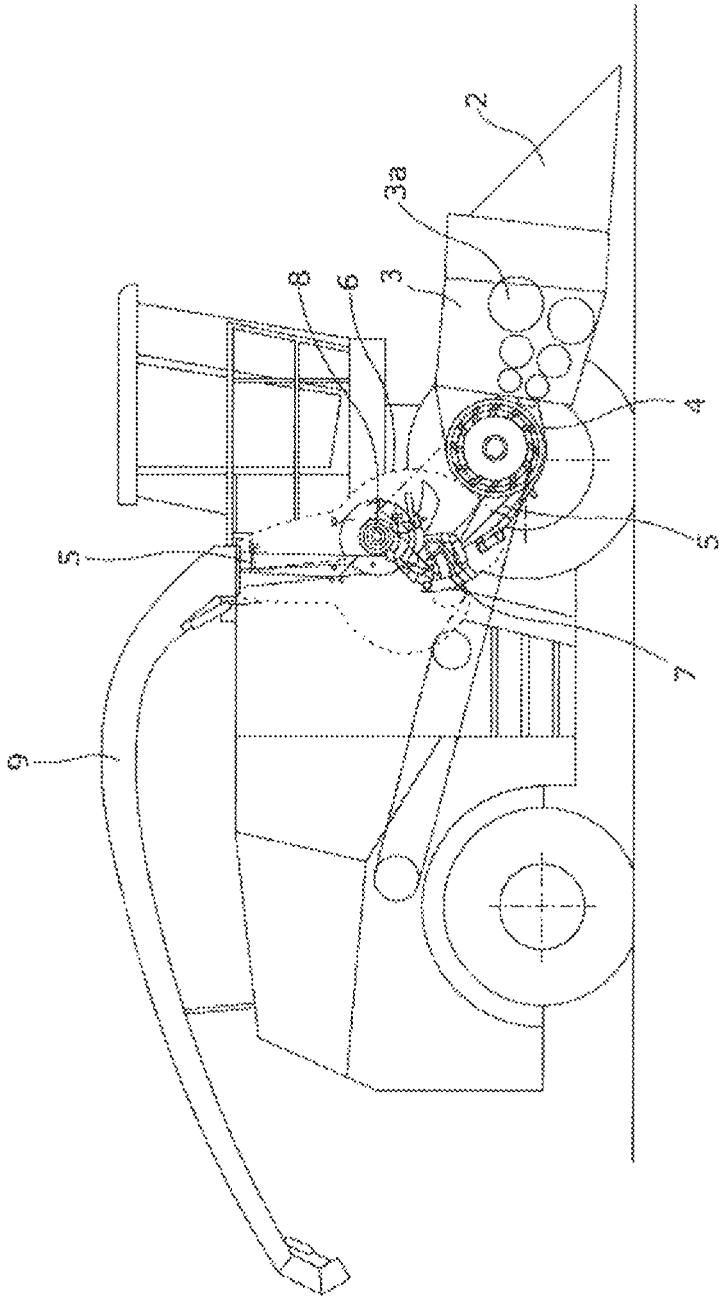
FIG. 1 shows a schematic side view of a forage harvester.

FIG. 1 shows a forage harvester provided with a front attachment 2 such as a header which contains cutting equipment for cutting and harvesting a crop. The cut crop is fed through a series of compression rolls 3*a* in a compression roller housing 3 to a chopper drum 4 where the crop is chopped into smaller pieces. The chopped crop passes through a duct 5 and is optionally directed into a cracker unit 6 where the crop is further crushed and threshed. The harvested crop is then blown upwards along a duct 5 by an accelerator 8 and exits through a spout 9.

Figure 2:
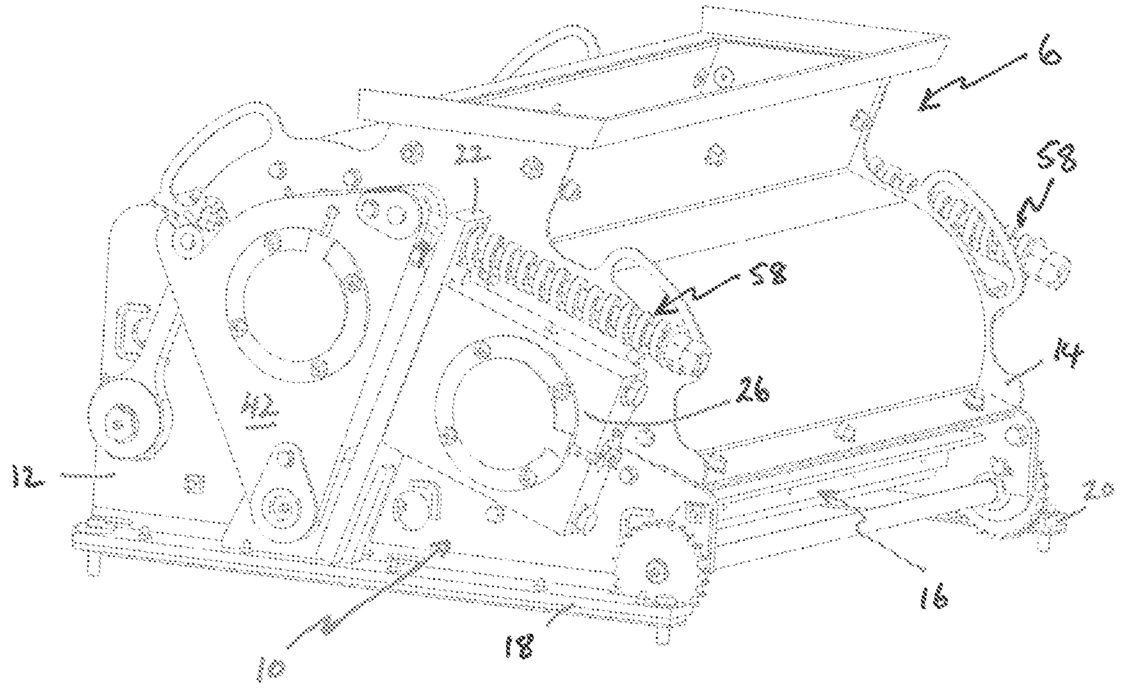
FIG. 2 shows a perspective view of a first embodiment of a cracker unit according to the present invention for use with a forage harvester.
Figure 3:
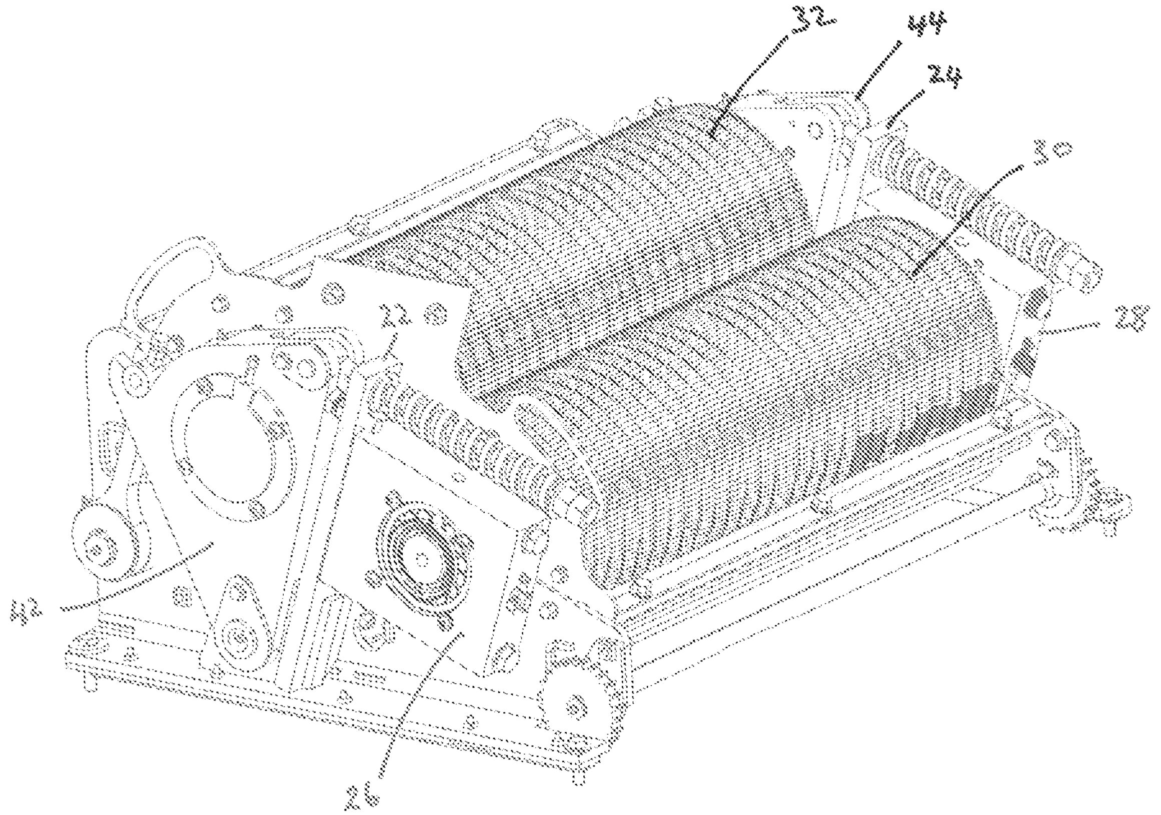
FIG. 3 shows a perspective view of a cracker unit for use with a forage harvester similar to that of FIG. 2 in which elements of the cracker unit have been omitted.
Figure 4:
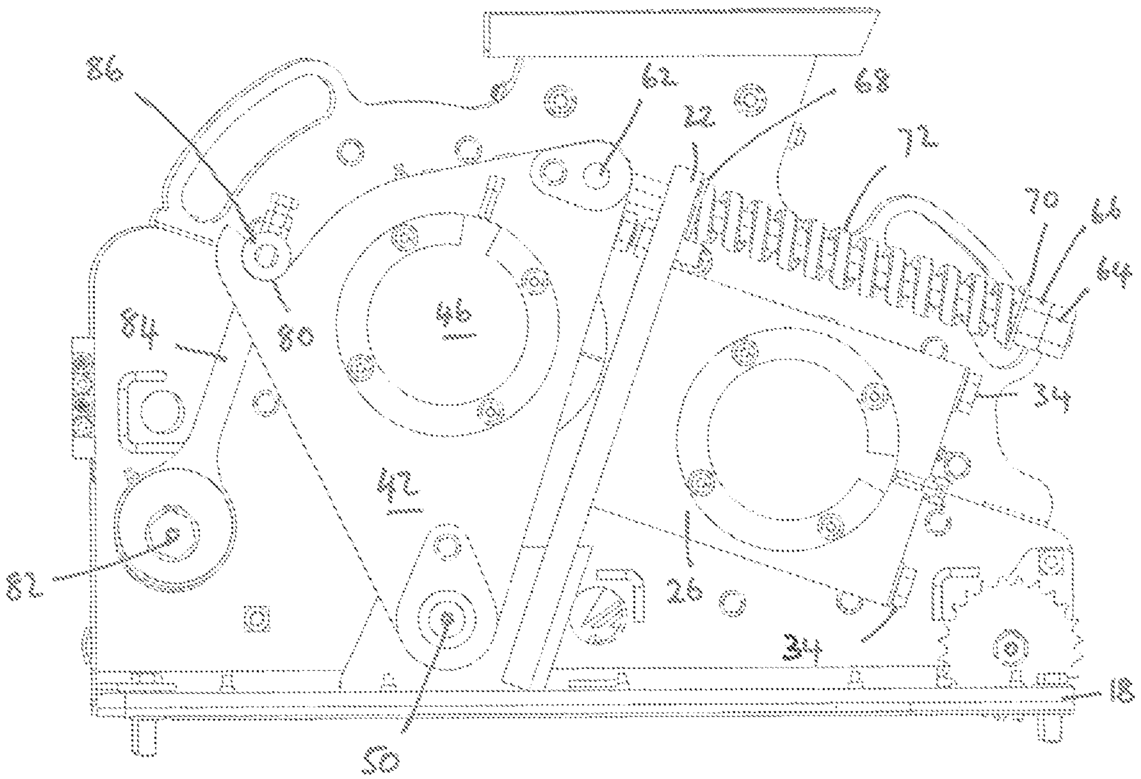
FIG. 4 shows a first side view of the cracker unit of FIG. 3 showing elements of a cracker unit in accordance with the present invention.

FIGS. 2 and 3 show perspective views of a first embodiment of a cracker unit 6 for use in a forage harvester. A base frame 10 of the cracker unit 6 comprises first and second side panels 12, 14 and connecting elements 16 extending between the first and second side panels 12, 14. Each side panel 12, 14 is provided with a outwardly extending lower flange 18, 20 and a post 22, 24 secured to the side panel 12, 16 and its lower flange 18, 20 by any suitable means, for example by welding of the post 22, 24 to the side panel 12, 14. The posts 22, 24 are arranged parallel to one another and each post 22, 24 conveniently extends at an angle to the adjacent lower flange 18, 20. In use the lower flanges are used to secure the cracker unit in position on a frame of the forage harvester 2.

Figure 5:
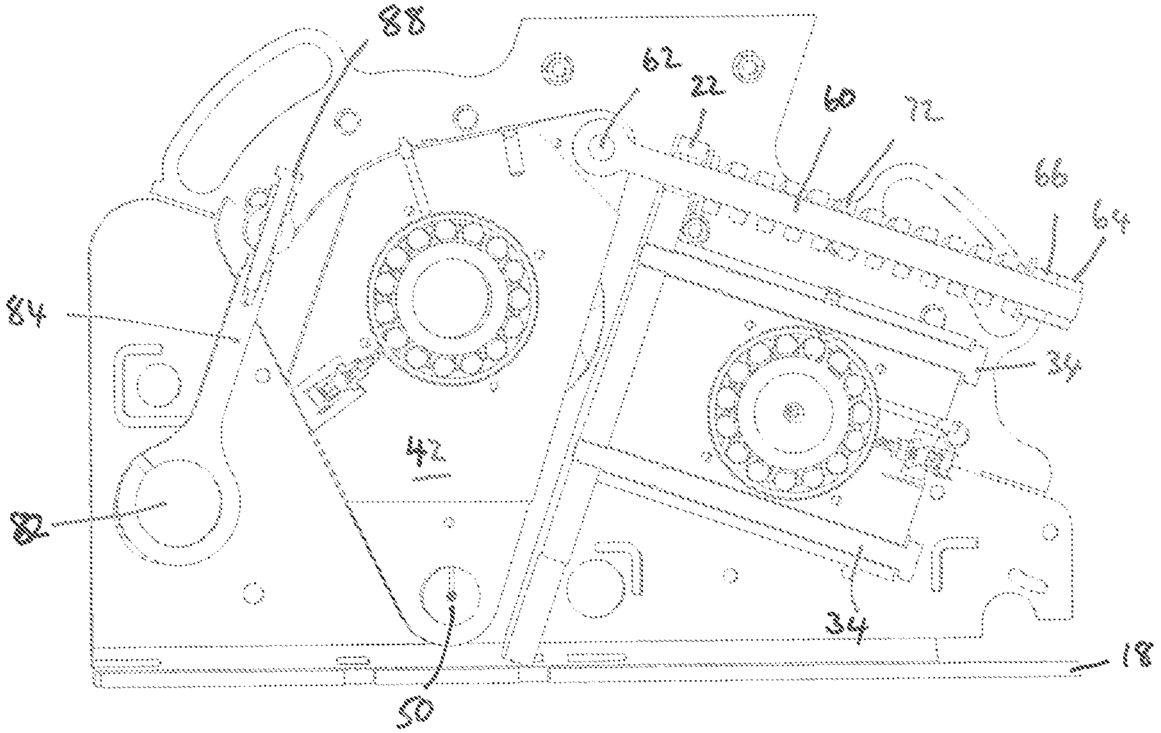
FIG. 5 shows a sectional view of the elements shown in FIG. 4.
Figure 6:
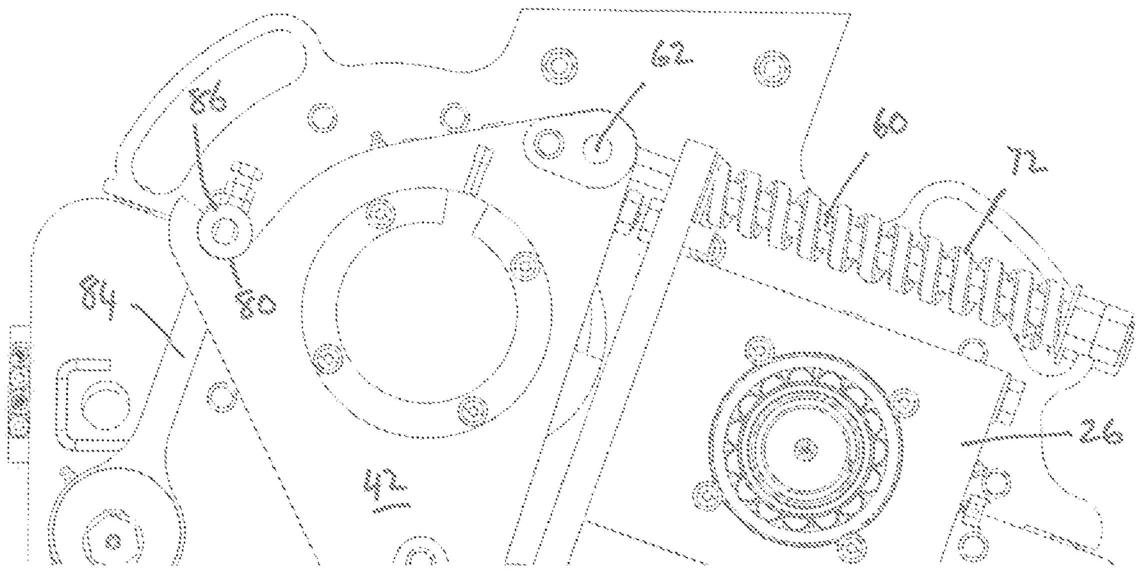
FIG. 6 shows a detailed view of elements shown in FIG. 4.
Figure 7:
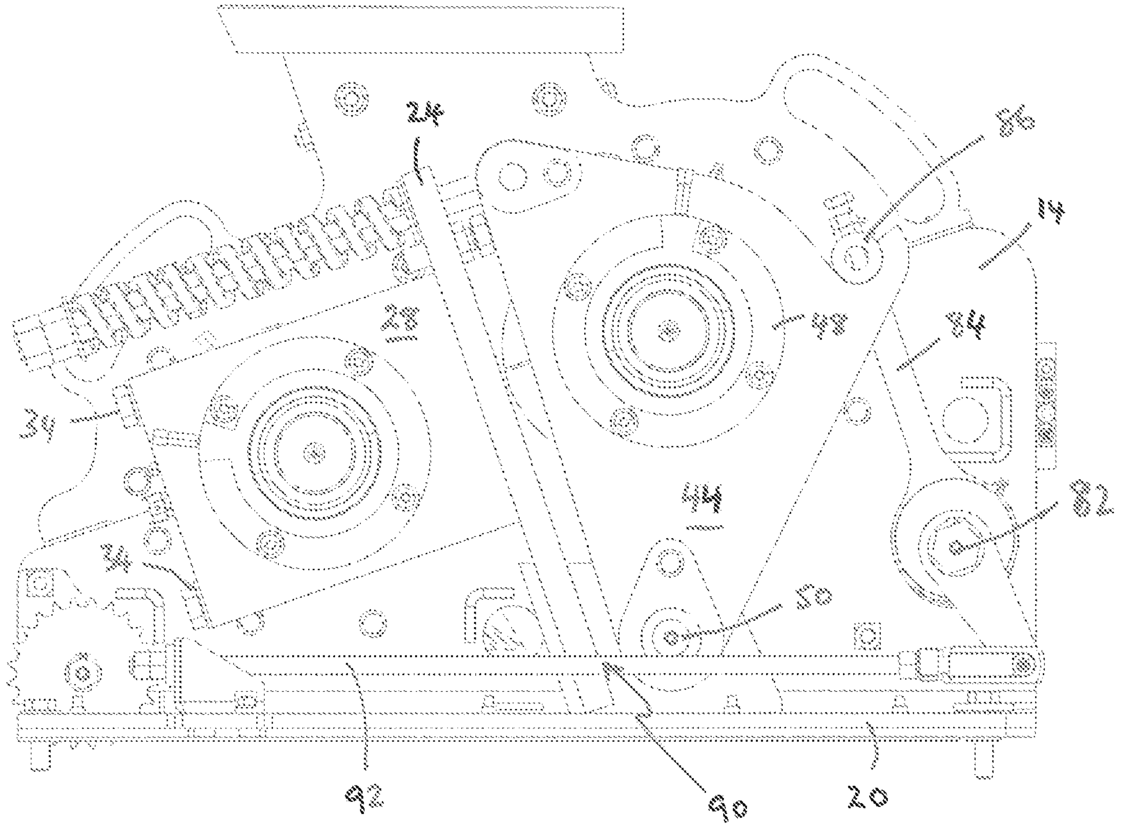
FIG. 7 shows an opposite side view of the forage harvester cracker unit in accordance with the present invention to that shown in FIG. 4.

Corresponding first mounting blocks 26, 28 are secured to a first side of each of the posts 22, 24. The first mounting blocks 26, 28 each house a suitable bearing for supporting first and second ends of a first cracker roller 30. In the illustrated embodiment, roller bearings are provided. The first mounting blocks 26, 28 may be secured to the posts in any suitable manner, for example by bolts 34 (see FIG. 5).

On a second side of each of the posts 22, 24 a secondary frame is provided. In the illustrated embodiment of FIGS. 2 to 7, the secondary frame comprises first and second end elements 42, 44 each of generally triangular form. In use each of the first and second end elements 42, 44 of the secondary frame is located adjacent to a respective side wall 12, 14 and is located within a width defined by outer edges of the side flanges 18, 20.

Each of the first and second end elements 42, 44 incorporate corresponding second mounting blocks 46, 48. The second mounting blocks 46, 48 each house a suitable bearing for supporting first and second ends of a second cracker roller 32. In the illustrated embodiment, roller bearings are provided.

The first and second end elements 42, 44 of the secondary frame are also connected by an axle 50 extending through a lower end of each of the first and second end elements 42, 44. The axle 50 extends though suitable openings in the first and second side walls 12, 14 of the base frame 10. The axle 50 allows the secondary frame to pivot with respect to the base frame 10 about a central axis of the axle 50.

An upper end of each first and second end element 42, 44 adjacent a post 22, 24 is provided with a mounting point. At each side of the cracker unit 6 a biasing arrangement 58 is secured to the mounting point. In the illustrated first embodiment of FIGS. 2 to 7, the biasing arrangement 58 comprises a central elongate shank member 60 provided at a first end with a threaded head and at a second end with an opening. The second end of the elongate shank member 60 is secured to the mounting point by a pivot pin 62. A shank of the elongate member passes through an opening provided in the upper ends of each of the posts 22, 24. The threaded head is conveniently provided with by first and second nuts 64, 66. Before the first and second nuts 64, 66 are secured in place a first washer 68, a spring element 72 and a second washer 70 are located about the shank of the elongate shank member 60. In use, each spring element 72 is under compression and so will seek to draw the respective first and second end elements 42, 44 of the secondary frame towards the corresponding post 22, 24, that will (with reference to FIGS. 2 to 6) cause the secondary frame to rotate clockwise about the axle 50.

An upper end of each of the first and second end elements 42, 44 of the secondary frame spaced from the posts 22, 24 is provided with a recessed portion 80.

The base frame 10 is provided at a second end with corresponding openings in the first and second side panels 12, 14. A drive shaft 82 extends through the openings. Ends of the drive shaft 82 serve as mountings for corresponding pivot levers 84 provided to each side of the cracker unit 6. Lower ends of each pivot lever are mounted on an eccentric bearing.

The upper ends of each pivot lever 84 are provided with pins 86 adapted to be seated within the recessed portions 80 of the corresponding first and second end elements 42, 44. As may be seen from FIG. 5, the pins 86 are conveniently retained by threaded elements 88 secured within a threaded recess of a main part of each pivot lever 84.

One end of the drive shaft 82 is connected to a drive 90 (see FIG. 7) such that longitudinal movement of a first shaft 92 causes the drive shaft 82 to be rotated. This in turn causes the pins 86 to pull down on the recessed portions 80 of the corresponding first and second end elements 42, 44 of the secondary frame and so rotate the secondary frame about the axle 50 and away from the adjacent posts 22, 24. The drive 90 may be actuated in any convenient manner.

In this way separation of the first and second cracker rollers 30, 32 can be controlled by operation of the drive 90 by an operator (for example by the operator entering a desired separation into a user interface located within a cab of the forage harvester 2 and an electronic control unit operating the drive to deliver the desired separation. The biasing element allows temporary widening of the gap between the first and second cracker rollers 30, 32 to prevent overloading of the bearings in the event of an excessive flow of harvested crop or of the passage of a foreign object between the first and second cracker rollers 30, 32.

Figure 8:
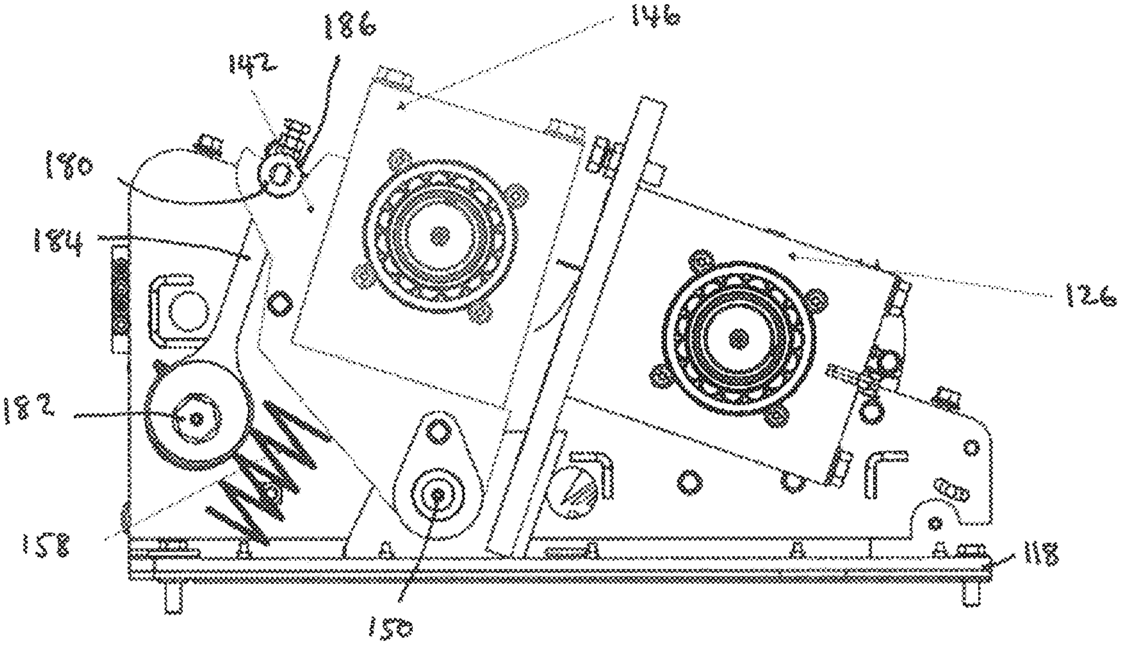
FIG. 8 shows a side view of a second embodiment of a cracker unit according to the present invention for use with a forage harvester.

In a second embodiment, shown in FIG. 8, the secondary frame again comprise first and second end elements 142 incorporating corresponding second mounting blocks 146. Like reference numerals are used to refer to like parts. The first and second end elements of the secondary frame are again connected by an axle 150 extending through a lower end of each of the first and second end elements. The axle 150 extends though suitable openings in the first and second side walls of the base frame. The axle 150 allows the first and second end elements of the secondary frame to pivot with respect to the base frame 110 about a central axis of the axle 150.

As in the first embodiment, an upper end of each of the first and second end elements of the secondary frame spaced from the posts is provided with a recessed portion 180 to be engaged by a suitable pin 186 on the associated pivot lever 184. The pivot levers 184 to each side of the cracker unit are mounted on shaft 182 and are provided with a drive as in the first embodiment.

However, in the second embodiment, the secondary housing is not provided with a biasing element acting between the secondary frame elements and the adjacent posts. Instead, a biasing arrangement 158 is arranged to each side of the cracker unit extending between the lower flange 118 and the secondary frame elements 142 mounted above the lower flanges 118.

Other elements of the cracker unit of the second embodiment correspond to those of the first embodiment.

As in the first embodiment, separation of the first and second cracker rollers 30, 32 can be controlled by operation of the shaft 182 and the biasing arrangement 158 allows temporary widening of the gap between the first and second cracker rollers as required during operation of the cracker unit.

All references cited herein are incorporated herein in their entireties. If there is a conflict between definitions herein and in an incorporated reference, the definition herein shall control.

From reading the present disclosure, other modifications will be apparent to persons skilled in the art. Such modifications may involve other features which are already known in the field of forage harvesters and component parts therefore and which may be used instead of or in addition to features already described herein.

From reading the present disclosure, other modifications will be apparent to persons skilled in the art. Such modifications may involve other features which are already known in the field of forage harvesters and component parts therefore and which may be used instead of or in addition to features already described herein.

What is claimed is:

1. A forage harvester cracker unit comprising a base frame comprising left and right hand side elements, a first cracker roller being mounted on the base frame to be rotatable about a fixed central axis extending between the left and right hand side elements of the base frame and a secondary frame comprising left and right hand side elements, a second cracker roller being mounted on the secondary frame to be rotatable about a central axis extending between the left and right hand side elements of the secondary frame, wherein the forage harvester cracker unit further comprises an axle extending between the left hand side elements of the base frame and the secondary frame and the right hand side elements of the base frame and the secondary frame forming a pivot axis extending through the base frame and the secondary frame, the secondary frame being adjustable about the pivot axis to enable variation of a separation of the first and second cracker rollers, a biasing element acting between the base frame and the secondary frame to urge the second cracker roller towards the first cracker roller and a drive element acting against the biasing element to hold the secondary frame in position against the biasing element to maintain a minimum separation of the first and second cracker rollers characterised in that the drive arrangement comprises includes a drive shaft parallel to but offset from the axle and supported for rotation in bearings provided in the left and right hand side elements of the base frame, parallel levers eccentrically mounted on the left and right hand sides of the drive shaft at a proximal end of each of the parallel levers, a distal end of each parallel lever being retained within respective left and right hand side elements of the secondary frame so that rotation of the drive shaft about its axis results in movement of the secondary frame with respect to the base frame and the distance between the first and second cracker rollers to be varied, the drive arrangement further comprising an actuator to control rotation of the drive shaft.

2. A forage harvester cracker unit according to claim 1, characterised in that the biasing element comprises parallel spring elements mounted on the base frame.

3. A forage harvester cracker unit according to claim 2, characterised in that the spring elements act to pull the secondary frame towards the base frame.

4. A forage harvester cracker unit according to claim 3, characterised in that the spring elements are mounted adjacent the first cracker roller.

5. A forage harvester cracker unit according to claim 2, characterised in that the spring elements act to push the secondary frame towards the base frame.

6. A forage harvester cracker unit according to claim 5, characterised in that the spring elements are mounted adjacent the second cracker roller.

7. A forage harvester according to claim 1, characterised in that each of the left and right hand side elements of the secondary frame are provided with recessed portions to receive the distal end of each lever.

8. A forage harvester according to claim 7, characterised in that the distal end of each lever is provided with a pin to be received within the recessed portions of each of the left and right hand side elements of the secondary frame.

* * * * *